(No Model.)
O. C. BECK.
DRAFT EQUALIZER.
No. 306,211. Patented Oct. 7, 1884.
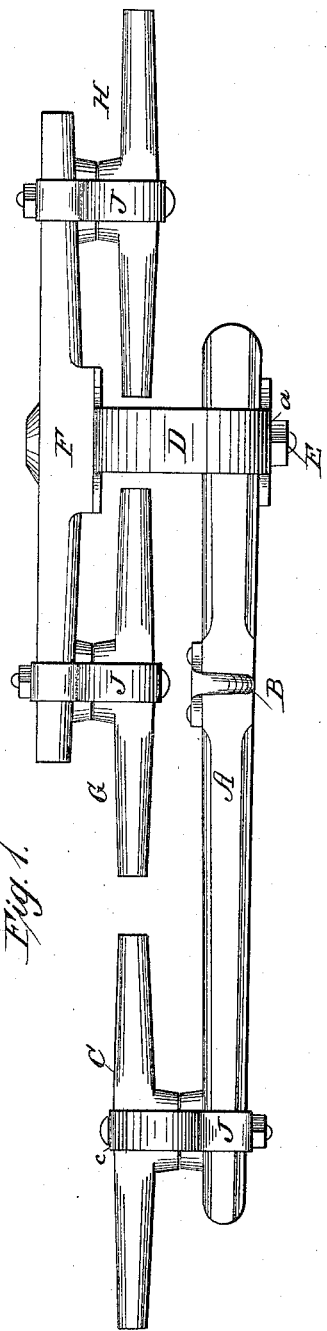
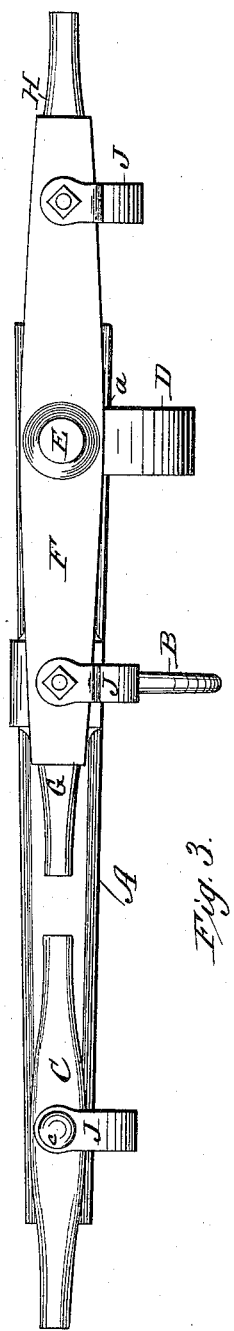
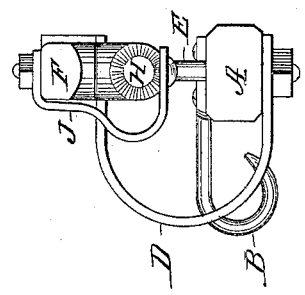
WITNESSES:
W. W. Hollingsworth
W. X. Stevens
INVENTOR:
O. C. Beck
BY Munn & Co
ATTORNEYS.

UNITED STATES PATENT OFFICE.

OLIVER C. BECK, OF RICKREAL, OREGON.

DRAFT-EQUALIZER.

SPECIFICATION forming part of Letters Patent No. 306,211, dated October 7, 1884.

Application filed February 25, 1884. (No model.)

*To all whom it may concern:*

Be it known that I, OLIVER C. BECK, a citizen of the United States, residing at Rickreal, in the county of Polk and State of Oregon, have invented certain new and useful Improvements in Draft-Equalizers, of which the following is a description.

This invention relates to that class of devices by means of which the draft of three horses working abreast is equalized upon a loosely pivoted cross-bar or tree.

The object of my invention is to equalize the draft of one horse drawing at one end of a tree or cross-bar by two horses drawing at the other end of the same tree.

To this end my invention consists in the combination of single-trees, a double-tree, and a treble-tree, hereinafter described and claimed, reference being had to the accompanying drawings, in which—

Figure 1 is a rear elevation of my invention. Fig. 2 is a plan view, and Fig. 3 is an end view, of the same.

A represents the treble-tree provided with a hook, B, to attach it to a plow or other working-tool.

C represents a single-tree pivoted at $c$ to the long end of the treble-tree.

D represents a standard-clevis firmly secured at $a$ to the short arm of the treble-tree.

E is a bolt passing through the double-tree, the clevis D, and the treble-tree, by means of which a double-tree, F, is pivoted on top of the clevis.

G and H are single-trees pivoted to the double-tree at equal distances from its pivot-bolt E. The clevis D is of such a height as to support the double-tree F above the plane of the single-tree C, when mounted, as shown, on top of the treble-tree, so that the single-trees G and H, depending from the double-tree, will be in the same horizontal plane as the single-tree C. Thus the three horses are made to draw in one and the same horizontal plane. The pivot-bolt E is one-half as far from the draft-hook B as the pivot of single-tree C is, so that the two horses drawing at the double-tree by the single-trees G H exactly balance the draft of one horse at single-tree C. If the distance between the pivots of the single-trees G and H is equal to the distance of pivot $c$ from hook B, then the horse hitched at G will be directly in the line of draft, and the two horses at C and H will be equal distances therefrom. By removing the bolt E the double-tree and its attachments are free to be used for any purpose where a span of horses is wanted.

The single-trees are secured to the double-tree and treble-tree by means of clevises J and pivot bolts.

What I claim as my invention, and wish to secure by Letters Patent, is—

The combination, with a treble-tree and a single-tree pivoted on one end thereof, of a standard-clevis firmly fixed to the other end, a double-tree mounted on said clevis by a pivot-bolt passing through the double-tree, the clevis, and the treble-tree, and two single-trees pivoted to the double-tree to depend therefrom, as shown and described.

OLIVER C. BECK.

Witnesses:
 U. C. FOX,
 J. H. PROCTOR.